No. 667,806. Patented Feb. 12, 1901.
W. A. SWAREN.
VOTING MACHINE.
(Application filed Apr. 13, 1900.)
(No Model.) 4 Sheets—Sheet 1.

WITNESSES.
S. R. Pollard
Frank Anderson

INVENTOR.
William A Swaren
By Atty N. DuBois

No. 667,806. Patented Feb. 12, 1901.
W. A. SWAREN.
VOTING MACHINE.
(Application filed Apr. 13, 1900.)
(No Model.) 4 Sheets—Sheet 2.

WITNESSES. INVENTOR.
S. R. Pollard. WILLIAM A. SWAREN.
Frank Hudson By Att'y N. DuBois.

No. 667,806. Patented Feb. 12, 1901.
W. A. SWAREN.
VOTING MACHINE.
(Application filed Apr. 13, 1900.)
(No Model.) 4 Sheets—Sheet 3.
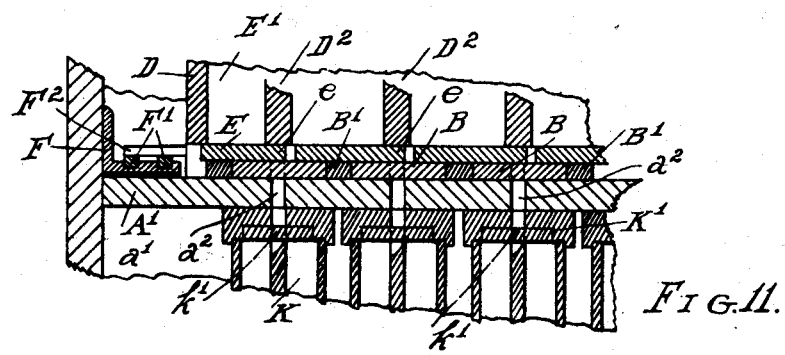
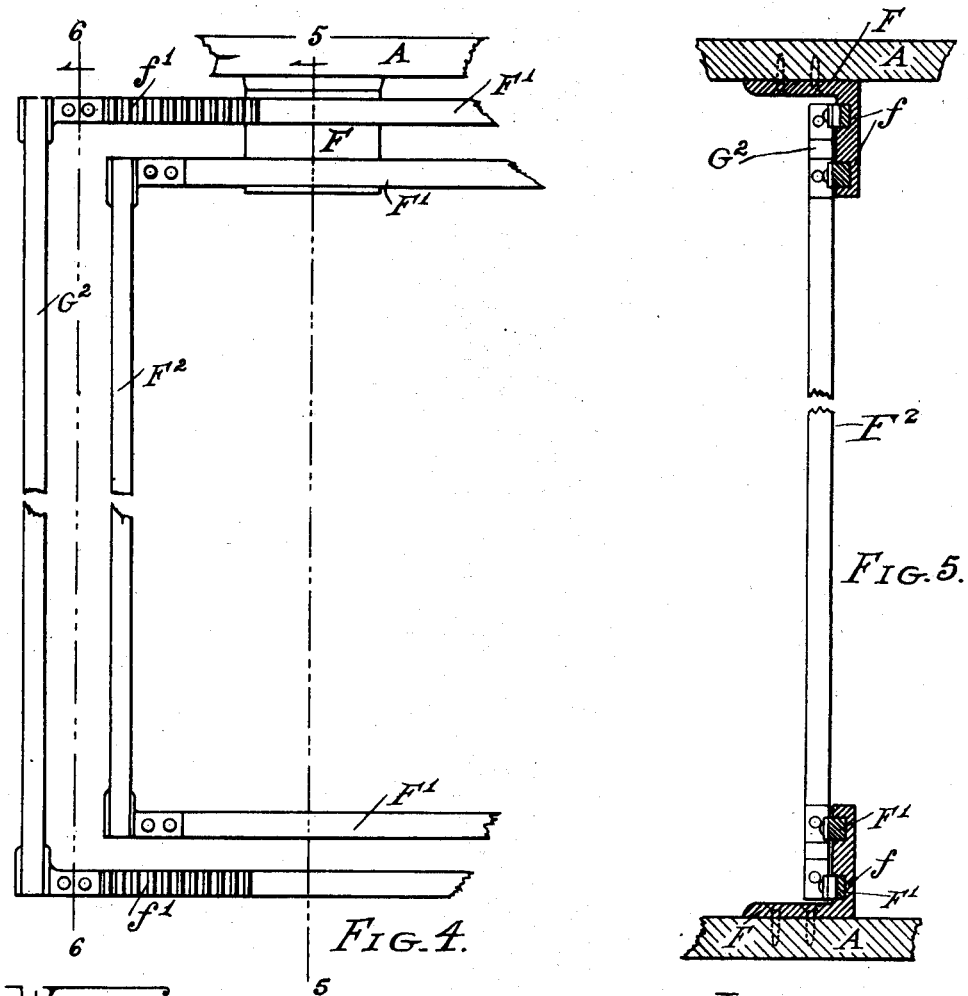
WITNESSES.
S. R. Pollard.
Frank Hudson
INVENTOR.
WILLIAM A. SWAREN
By Att'y N. DuBois.

No. 667,806. Patented Feb. 12, 1901.
W. A. SWAREN.
VOTING MACHINE.
(Application filed Apr. 13, 1900.)
(No Model.) 4 Sheets—Sheet 4.

WITNESSES.
S. R. Pollard.
Frank Hudson

INVENTOR.
WILLIAM A. SWAREN.
BY ATT'Y N. DuBois.

THE NORRIS PETERS CO., PHOTO-LITHO., WASHINGTON, D. C.

UNITED STATES PATENT OFFICE.

WILLIAM A. SWAREN, OF CHICAGO, ILLINOIS, ASSIGNOR OF ONE-HALF TO HAMILTON C. KIBBIE, OF OBLONG, ILLINOIS.

VOTING-MACHINE.

SPECIFICATION forming part of Letters Patent No. 667,806, dated February 12, 1901.

Application filed April 13, 1900. Serial No. 12,754. (No model.)

*To all whom it may concern:*

Be it known that I, WILLIAM A. SWAREN, a citizen of the United States, residing at No. 181 Dearborn avenue, in the city of Chicago, county of Cook, and State of Illinois, have invented certain new and useful Improvements in Dropping Mechanism for Voting-Machines or the Like, of which the following is such a full, clear, and exact description as will enable others skilled in the art to which it appertains to make and use my said invention.

My invention relates to the dropping mechanism of voting-machines or other analogous apparatus which employ balls or equivalent means to be deposited in suitable receptacles adapted to receive them, where they may be counted for the purpose of determining the number of ballots or balls cast for each candidate, measure, or object for which the ballots or balls are or may be deposited; and the purpose of my invention is to provide means adapted to automatically separate the balls and assort them with respect to the receptacles into which they are to be dropped and afterward drop them into said receptacles, respectively, as hereinafter set forth.

With this general purpose in view my invention consists in the novel features of construction and combinations of parts shown in the annexed drawings, to which reference is hereby made, and hereinafter particularly described, and pointed out in the claims.

Figure 1:
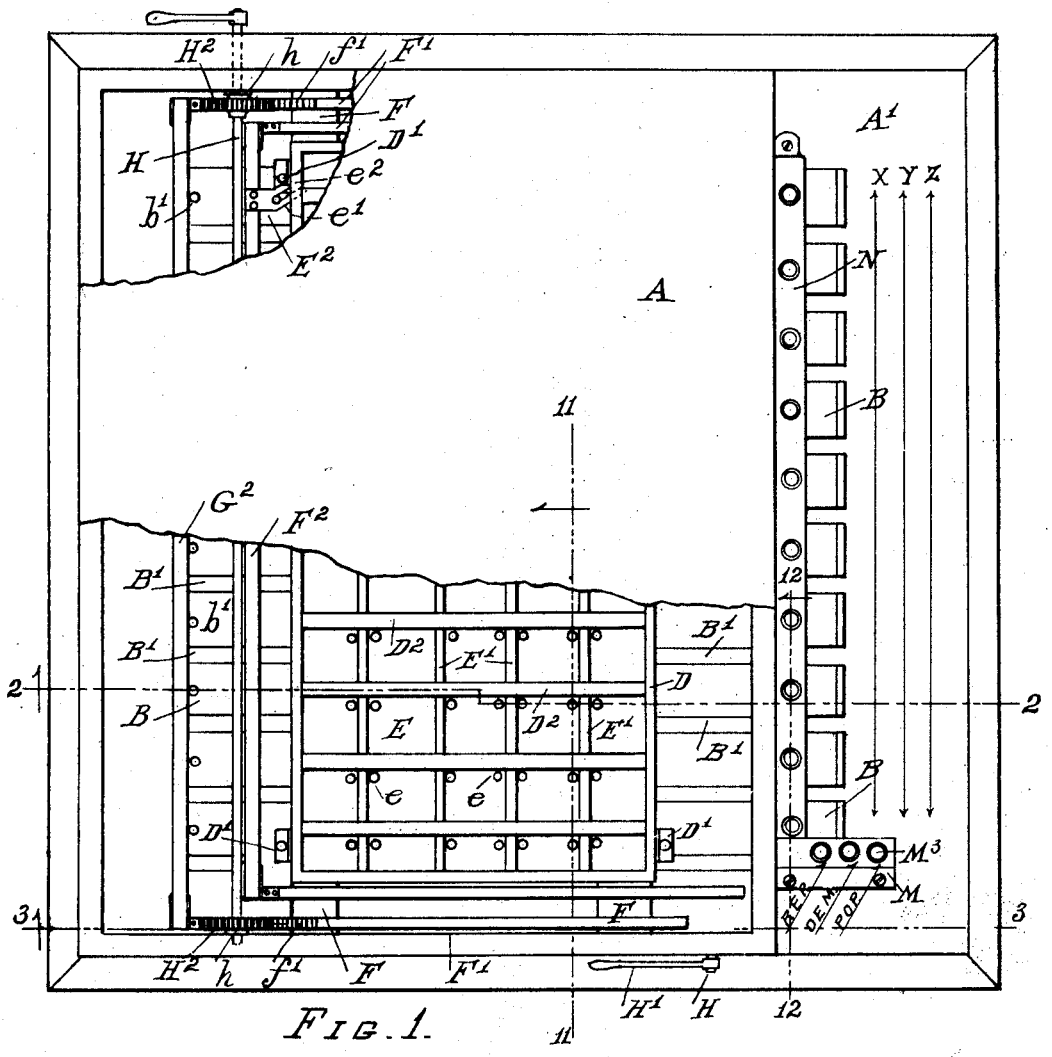
Figure 12:
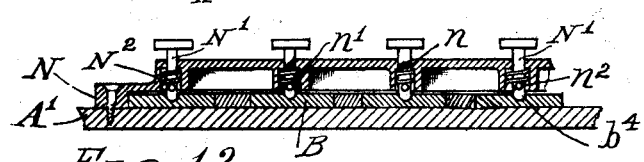
Figure 2:
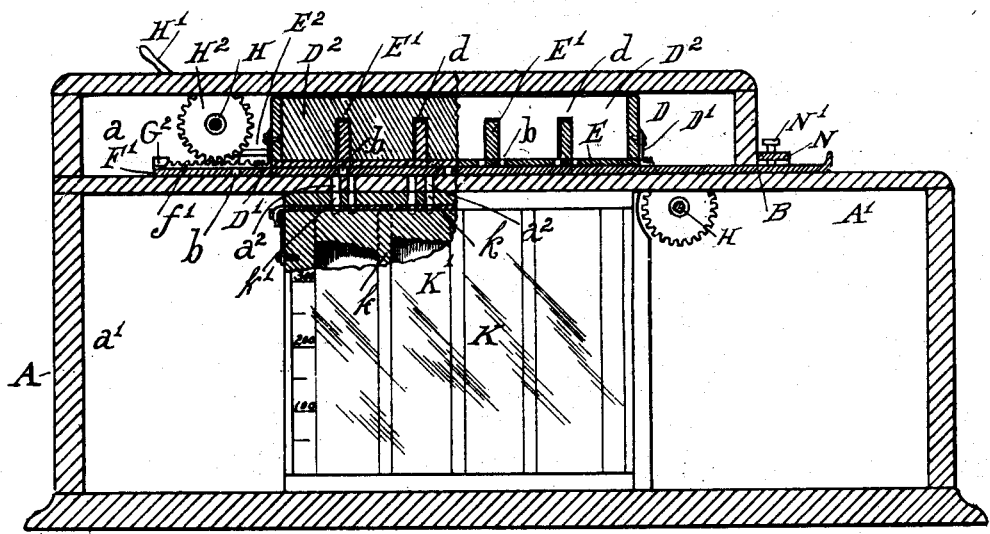
Figure 3:
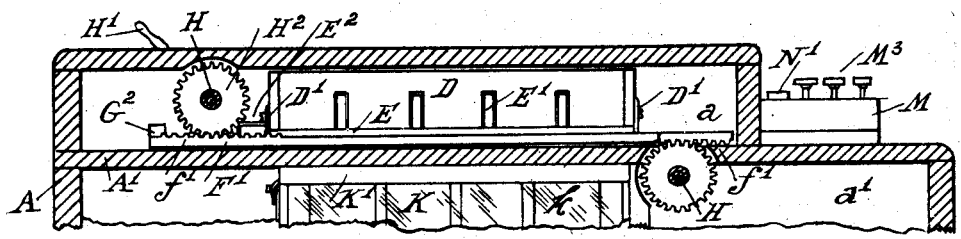
Figure 6:
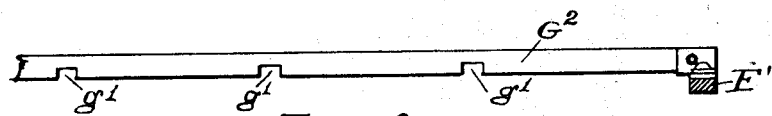
Figure 7:
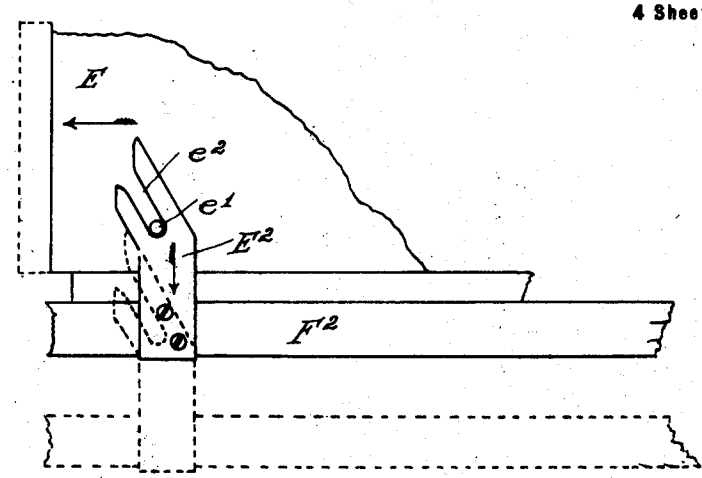
Figure 8:
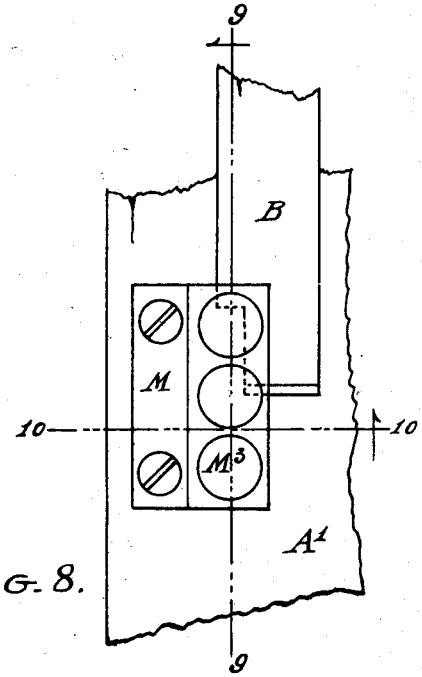
Figure 9:
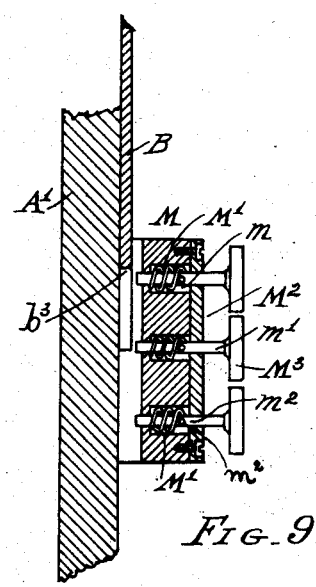
Figure 10:
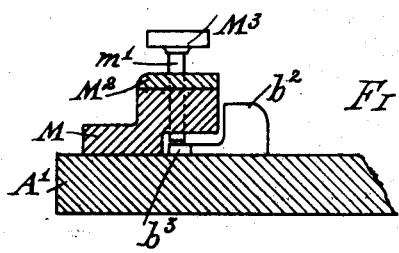

Referring to the drawings, Figure 1 is a top plan of the apparatus, the cover being shown as broken away so as to expose the underlying parts. Fig. 2 is a vertical transverse section on the line 2 2 of Fig. 1. Fig. 3 is a vertical transverse section on the line 3 3 of Fig. 1. Fig. 4 is an enlarged detached top plan of the rack-bars and their connecting cross-pieces and one of the brackets supporting same. Fig. 5 is a vertical longitudinal section on the line 5 5 of Fig. 4. Fig. 6 is a vertical partial longitudinal section on the line 6 6 of Fig. 4. Fig. 7 is an enlarged top plan of a part of the perforated cut-off plate and coöperating parts and shows a part of the rear bar of the sliding frame and the cam-plate secured thereto, which serves to move the perforated plate. Fig. 8 is an enlarged top plan of the stop mechanism which serves to limit outward movement of the slides. Fig. 9 is a vertical section through the stop mechanism on the line 9 9 of Fig. 8. Fig. 10 is a vertical section through the stop mechanism on the line 10 10 of Fig. 8. Fig. 11 is an enlarged partial vertical section on the line 11 11 of Fig. 1. Fig. 12 is an enlarged partial vertical longitudinal transverse section through the slide-setting devices on the line 12 12 of Fig. 1.

Similar letters of reference designate like parts in all of the views.

In the drawings I have illustrated my dropping mechanism as applied to a voting-machine. It may, however, with such slight modifications as will be apparent to those skilled in the art and without departing from my invention, be adapted for use in other analogous apparatus—such, for example, as cash-registers, in which the balls may be separated, assorted, and dropped into different receptacles, respectively, receiving balls representing different units of value, such as dimes, quarter-dollars, half-dollars, dollars, &c.

The operative mechanism is contained in a suitable cabinet A, separated by a horizontal partition A' into an upper compartment $a$ and a lower compartment $a'$. Slides B slide between guides B', secured on the upper surface of the partition A'. A rectangular hopper D is supported within the cabinet A by standards D', suitably secured on the part A'. The lower edges of the hopper lie somewhat above the upper surface of the slides and guides. The part A' is pierced by a number of series of holes $a^2$, overlying exactly the holes $k'$ in the caps K' of the ball-boxes K. A plate E, which is preferably made of hard rubber or other like material not easily affected by moisture, overlies the slides and guides, is slidable freely under the hopper D, and is pierced by a series of holes $e$, which correspond in number to and are registrable with the holes $a^2$ in the part A'. Partitions $D^2$ are secured at their ends to the sides of the hopper and divide it into a series of longitudinal compartments. In conjunction with the plate E they also serve as cut-offs. When the plate E is moved transversely to bring the holes $e$ into position to register with the holes $a^2$ in the part A', as hereinafter explained, the holes $e$ pass under and are covered by the partitions, so as to prevent more than one ball at a time from entering each of the holes $e$ and falling thence into the underlying ball-boxes. The holes $e$ in the plate E fill during the first or outward movement of the plate. During this initial movement of the plate E the holes $e$, each containing one ball, pass under the partitions or cut-offs $D^2$ and beyond the position which they would occupy if in registry with the holes $a^2$ and out of range of the holes $b$ in the slides B. The slides may then be pushed inward or outward at will without bringing the holes $b$ into registry with the holes $e$, and the balls contained in the holes $e$ will roll on top of the slides B. During this period the holes $b$ in the slides cannot come into position for balls to fall therethrough into the underlying ball-boxes; but they may come into such position after the slides have been moved and just before the return movement of the plate E, as hereinafter explained. The holes $e$ are in line with and registrable with the holes $a^2$ in the plate A'. They are also in line with the holes $b$ in the slides B, and the slides B may be slid forward or rearward to cause one hole $b$ in each of the slides B to simultaneously register with a hole $a^2$ in the part A' and a hole $k'$ in the cap K' of the ball-boxes K, thereby placing the hole $b$ in such position that a hole $e$ in the plate E may upon the second or return movement of the plate E be brought into registry therewith, so that balls may pass through the registering holes $e$, $a^2$, $b$, and $k'$ into the box K.

In the apparatus as applied to a voting-machine the plate E is under the control of and is operated by the judges of election; but the slides B are under the control of the voter, and he may, if he wishes, make as many different settings as there are different slides and may change the settings of the slides at pleasure.

The employment of a series of independent slides or equivalent devices each representing an office and each settable in a number of different operative positions with respect to the perforated plate or equivalent ball-dropping device and also with respect to the ball-boxes is entirely new and is of great practical advantage, because it enables the voter to review the setting of the slides and to correct erroneous settings before the balls are finally dropped into the ball-boxes and also because the peculiar construction and arrangement of parts permits the use of a single slide in voting for all the candidates for the office represented by that slide, thus enhancing the simplicity and effectivness of the apparatus.

Transverse plates E' are secured in a vertical position on the perforated plate E and extend through openings $d$ in the sides of the hopper and in the partitions $D^2$, and the plates E' move with the perforated plate E. The plates E' serve to divide the hopper into compartments, and when they move with the plate E they also serve to agitate the balls, so as to cause them to fall into the holes $e$ in the plate E. A vertical pin $e'$ is suitably secured on and projects above the plate E. Angle-plates F, having longitudinal channels $f$ in their horizontal members, are secured to the end walls of the cabinet A. Rack-bars F', having racks $f'$, slide freely in the channels $f$. The bars F' are in pairs. The bars of the outer pair, which are contiguous to the ends of the cabinet, have the racks $f'$ on their upper sides, and the bars of the inner pair have the racks on their under sides. A cross-piece $G^2$ connects the rear ends of the outer pair of bars, and a cross-piece $F^2$ connects the rear ends of the inner pair of bars. The cross-pieces $F^2$ and $G^2$ are both on the same level and are slidable above the slides B.

Longitudinal shafts H are mounted in suitable bearings $h$ on the ends of the cabinet A, and one end of each shaft projects through an end of the cabinet and is provided with a handle H', by means of which the shafts may be respectively oscillated. Cog-wheels $H^2$ are secured to the shafts H and mesh with the racks $f'$ on the upper sides of the outer pair of bars F' and the lower sides of the inner pair of bars F', respectively. The rear handle H' operates the outer pair of bars F' and their connecting cross-piece $G^2$, and the front handle H' operates the inner pair of bars F' and their connecting cross-piece $F^2$. When the rear handle H' is pushed forward, one pair of cog-wheels $H^2$ engages with the racks $f'$ on the upper sides of the bars F' to slide rearward the outer pair of bars and their connecting cross-piece $G^2$. When the front handle H' is pulled forward, one pair of cog-wheels $H^2$ engages with the racks $f'$ on the under sides of the inner pair of bars F' to slide forward the inner pair of bars and their connecting cross-piece $F^2$. Reverse movements of the handles H' produce reverse movements of the cross-pieces $F^2$ and $G^2$.

Pins $b'$ are secured to and project upward from the slides B and are engaged by the cross-pieces $F^2$ and $G^2$ to move the slides B inward or outward, as hereinafter explained.

In the mechanism as employed in voting-machines certain of the slides (in this case the three slides nearest to the right-hand end of the machine as viewed from the front) are termed "referendum-slides," and are slidable forward or rearward independently of the cross-piece $G^2$, but are slid rearward with all of the other slides by the cross-piece $F^2$ engaging with the pins on the slides. The cross-piece $G^2$ has on its under side transverse notches $g'$, so placed that the notches travel over the pins $b'$ of the referendum-slides when the cross-piece $G^2$ moves forward. Hence the cross-piece $G^2$ does not engage with the pins of the special or referendum slides to move them forward. In order to distinguish the different slides, I will hereinafter designate as "general" slides all of the slides except the special or referendum slides.

When employed in an apparatus such as a cash-register, the general slides may be used in registering cash transactions only, and the referendum or equivalent slides may be used to register ticket charges or credits or the making of change or other incidental or secondary transactions of which it is desired to keep a record.

The holes $b$ are so placed that not more than one hole $b$ in any one of the slides can come into registery with more than one hole $k'$ at the same time. It will be seen, then, that one ball only can be dropped into one compartment only of each box at each setting of the slides, respectively.

A plate $E^2$, having an inclined fork $e^2$, is secured on the bar $F^2$ in such position that the pin $e'$ may enter the fork. When the bar $F^2$ moves backward, the right-hand inclined side of the fork $e^2$ as viewed from the rear engages with the pin $e'$, and thereby moves the plate E to the left, as indicated in dotted lines in Fig. 7, and in like manner forward movement of the bar $F^2$ causes the plate E to move to the right.

When the dropping mechanism herein described is used in voting-machines, it is desirable that all of the general slides may be moved outward simultaneously and that all may be simultaneously stopped at the predetermined stages of their outward movement.

In the dropping mechanism as applied to voting-machines the number of general slides used is equal to the number of offices for which there are candidates to be voted for and the number of referendum-slides is such as may be necessary to enable the voter to record his vote for or against any referendum measure or proposition submitted to be voted upon or to record his purpose to refrain from voting on any measure or proposition so submitted.

In the lower compartment $a'$ of the cabinet are placed side by side a series of boxes K equal in number to the number of slides B, one box being directly under each slide. Each of the boxes K is divided into partitions $k$ into a number of compartments equal to or exceeding the number of candidates for whom balls or ballots may be deposited by means of the slides coöperating with the boxes, respectively. For example, if there are five candidates for the office of sheriff then the box underlying that slide used in voting for candidates for the office of sheriff must have five or more compartments, in order that there may be a separate compartment to contain the ballots which may be cast for each of said candidates, respectively, and there may also be an additional compartment to receive balls deposited by the voter to indicate his purpose to refrain from voting for any candidate for the office represented by said slide. Each compartment of the boxes K is of such dimensions that the balls therein will lie in rows one above the other, each row containing exactly ten balls. Graduations on the sides of the boxes indicate the number of balls in each compartment.

It is necessary that the slides B shall stop with one hole $b$, and only one, in registry with a hole $k'$ opening into the compartment intended to receive balls to be deposited for each individual candidate, and as the holes in the slides are not visible from the outside of the cabinet it is necessary to provide means whereby the voter or operator may know that the slides are respectively set in proper position to deposit balls in the compartments assigned to the individual candidates of his choice. This result I accomplish by means which I will now describe.

An angle-plate M is suitably secured on top of the part $A'$ contiguous to the left-hand slide B. Springs $M'$ are housed in recesses $m$ in the plates M. A cap $M^2$ is suitably secured to the plate M. The stems $m'$ of keys $M^3$ slide freely in holes in the plate M and the cap $M^2$. Pins $m^2$ on the stems $m'$ engage with the springs $M'$ to compress the springs when the keys are pressed downward, and the springs react to raise the keys. Part of the upturned part $b^2$ of the slide B contiguous to the plate M is cut away, so that the slide may move freely under the projecting part of the plate. A part of the slide B is cut away, so as to leave a shoulder $b^3$, which engages with the stems $m'$, as hereinafter explained.

In the drawings I have given the keys the designations "Rep.," "Dem.," and "Pop.," signifying the Republican, the Democratic, and the Populist parties, respectively. When used in other apparatus, such as cash-registers or the like, other designations may be given to the keys—such, for example, as "Dr.," "Cr.," and "Change," respectively—designating the key which should be employed in registering debit items, credit items, and the making of change. In like manner other and different designations may be employed to indicate other and different uses of the keys. In the drawings I have shown three keys $M^3$; but a greater or less number of keys or equivalent slide-stopping devices may be employed without departing from my invention.

In practical use all of the general slides B may be pushed simultaneously outward by the bar $G^2$ engaging with the pins $b'$ on the slides. If the outward movement of any one of the slides is stopped, the pin $b'$ on that slide will stop any further movement of the bar $G^2$. It will be seen, then, that if any one of the slides is stopped at any one of a number of stages of its outward movement the same stopping device which stops that slide will serve in like manner to stop all of the slides except the referendum-slides.

In order that balls may fall into the proper predetermined compartments in the boxes K, the slides must stop with one hole $b$ in each slide in registry with one hole $k'$ opening into the desired compartments of the boxes K, respectively.

If it is desired to deposit balls in the same compartment of all the boxes, any one of the keys $M^3$ may be pressed down so that the shoulder $b^3$ of the slide B will abut against the stem of the key and stop the slide, and thereby cause all of the other slides to stop in the same position with a hole $b$ in registry with a hole opening into compartments of the same character in all of the boxes.

In using a voting-machine embodying my improvements the party is taken as representing a genus of which the office is a species and the individual candidate a subspecies. The voter wishing to vote first determines the genus of his vote by selecting the proper key having the generic designation "Rep.," "Dem.," or "Pop.," as the case may be. He then selects a slide representing the specific office or measure to be voted upon and then sets the slide in a position to deposit a ballot for a specific candidate for said office. If a voter wishes to deposit a ballot for the Democratic candidate for every office represented by a slide, he will push down the "Dem." key, thereby stopping all of the slides with a hole $b$ in each slide in registry with a hole $k'$, opening into the compartment intended to receive balls deposited for the Democratic candidate for the offices represented by the slides, respectively.

Although all of the slides may be moved simultaneously outward by the bar G, they may be moved inward separately and set in any desired position.

To determine the various independent settings of the slides B, I preferably employ means which I will now describe.

A bar N, suitably secured to the plate A', extends across the machine above the slides B, and the slides are slidable under the bar. Bolts N' are slidable in vertical holes $n$ in the plate N, said holes being directly above the central lines of the slides B, respectively. Springs $N^2$ surround the bolts N' and are housed in recesses $n'$ in the plate N. Pins $n^2$ pass through the bolts N', and the springs act against the pins to push the bolts downward. In the upper face of each of the slides B is a series of shallow depressions $b^4$, so spaced that when the lower end of a bolt N' rests in a depression $b^4$ of a slide one hole $b$ of the same slide will be in registry with a hole $a^2$ in the part A' and a hole $k'$ in a box K, so that a ball may be dropped through the slide into the underlying ball-box. The depressions $b^4$ are of such depth that the seating therein of the rounded lower ends of the bolts N' will be sensible to the touch of the person manipulating the slides; but they are not deep enough to cause the bolts to lock the slides. The construction and arrangement of the parts are such that the slides may be moved to and fro under the bolts, and every time a hole in a slide comes into registry with a hole in the part A' a bolt will enter a depression $b^4$ and will thereby impede the movement of the slide sufficiently to apprise the user as to the position of the slide. The several independent settings of the slides may also be indicated by lines X, Y, and Z, so placed on the part A' that when a slide is pulled outward the end of the slide will register with one of the lines at each successive stage of its outward movement. I do not, however, restrict my claims to the precise means described for indicating or determining the successive stages or the several settings of the slides, since any other suitable or convenient means, such as graduations on the slides themselves, successively registering with the lower edge of the front wall of the upper part of the cabinet, may be used without departing from my invention.

If the key marked "Pop" be pressed down and the slides simultaneously pushed outward until stopped by the stem of the key, as already described, any one of the slides may afterward be pushed inward or pulled farther outward and stopped in registry with any one of the lines X, Y, or Z without effecting the movement of any other slide. After the bar $G^2$ has moved forward to push all the slides outward it may preferably be moved rearward by the voter pulling forward the rear handle H'; but if the voter fails to pull the handle the pin $b'$ on the slide first pushed inward will engage with the bar $G^2$ and move it rearward, and the racks $f'$ on the bars F' will mesh with the teeth of the wheels $H^2$ to turn the wheels forward, causing the shaft H to turn in the same direction and return the rear handle H' to the position which it occupied before it was pushed rearward to move the bar $G^2$ forward. After the bar $G^2$ has been moved rearward, as described, any or all of the slides may be freely moved inward or outward and may be stopped at any desired stage of their movement within the limits of the distance between the bars $F^2$ and $G^2$. All of the slides may be moved simultaneously inward by pushing rearward the left-hand handle H', thereby causing the bar $F^2$ to engage with the pins $b'$ on all of the slides and move all of the slides inward. The voter may actuate the bar $G^2$ for straight-ticket voting or for simultaneously pushing out all of the slides preparatory to miscellaneous voting, and the election official may actuate the bar $F^2$ to cause the deposit of balls in the boxes in accordance with the setting of the slides by the voter and also to cause the retraction of all of the slides, so that the next succeeding voter may not see how his predecessor voted. After all of the slides have been pushed inward the pin $b'$ on the slide first pulled outward will engage with the bar $F^2$ and move it forward, so that thereafter any of the slides may move freely inward or outward within the limits of the distance between the bars $F^2$ and $G^2$.

Having fully described my invention, what

I claim as new, and desire to secure by Letters Patent, is—

1. In an apparatus of the class described, the combination of ball-receptacles having compartments and having holes opening into said compartments, perforated slides slidable above said receptacles and having holes registrable with the holes opening into the compartments of said receptacle, a hopper supported above said slides, and a perforated plate slidable between said hopper and said slides and having holes registrable with the holes in said slides, substantially as set forth.

2. In an apparatus of the class described, the combination of a hopper having partitions, a perforated plate slidable under said hopper, partitional plates secured to and moving with said perforated plate and slides having holes registrable with the holes in said perforated plate, substantially as set forth.

3. In an apparatus of the class described, the combination of a hopper, a perforated plate under said hopper, perforated slides movable by stages to bring holes in said slides into position for holes in said plate to come into registry with holes in said slides, and means for indicating the different stages of movement of said slides, as set forth.

4. In an apparatus of the class described, the combination of a dropping device movable by stages, with means for indicating the different stages of movement of said dropping device.

5. In an apparatus of the class described, the combination of a dropping device movable by stages, with means for indicating the different stages of movement of said dropping device and means for stopping said dropping device at different stages of its movement.

6. In an apparatus of the class described, the combination of general dropping devices movable alternately to and fro, special dropping devices movable alternately to and fro, means for moving said general dropping devices independently of said special dropping devices, and means for simultaneously moving said general dropping devices and special dropping devices, substantially as set forth.

7. In an apparatus of the class described, the combination of general dropping devices, special dropping devices, and means for supplying balls to said dropping devices, as set forth.

8. In an apparatus of the class described, the combination of ball-receptacles, dropping devices movable relative to said receptacles and means for supplying balls to said dropping devices, substantially as set forth.

9. In an apparatus of the class described, a stop device consisting of an angle-plate provided with keys, the stems of which are slidable in said plate in combination with a slide having a shoulder adapted to engage with the stems of said keys, as set forth.

10. In an apparatus of the class described, the combination of dropping slides provided with pins, a slidable cross-piece engaging with the pins to move them in one direction, and a second slidable cross-piece engaging with the pins on said slides to move the slides in the opposite direction, and means for reciprocating said cross-pieces, as set forth.

11. In an apparatus of the class described, the combination of slides provided with pins, a slidable cross-piece having notches in line with the pins on part of said slides, said cross-piece serving to engage with the pins on and move part of said slides, and to permit part of the slides to remain at rest by reason of the notches in said cross-piece passing over the pins on said last-named slides, as set forth.

12. In an apparatus of the class described, the combination of a partitioned hopper, a perforated plate slidable under said hopper, perforated dropping slides slidable under said plate, and ball-boxes having compartments and provided with openings with which the perforations in said plate and said slides are registrable, as set forth.

13. In an apparatus of the class described, the combination of a partitioned hopper, a perforated plate slidable under said hopper and having vertical plates transverse thereto, perforated dropping slides slidable under said plate, and ball-boxes under said slides having compartments and provided with openings with which the perforations in said slides and said plate are registrable, as set forth.

14. In an apparatus of the class described, the combination of a hopper, a perforated plate under said hopper, dropping slides slidable under said plate, ball-boxes under said slides having openings with which the perforations in said plate and said dropping slides are registrable, means for moving said slides independently of said plate, and means for simultaneously moving said plate and said slides, as set forth.

15. In an apparatus of the class described, the combination of a hopper, a perforated plate slidable under said hopper, perforated dropping slides slidable under said plate, ball-boxes under said slides having openings with which the perforations in said slides and said plate are registrable, and means for simultaneously moving said slides and said plate, as set forth.

16. In an apparatus of the class described, the combination of a cabinet, a ball-hopper in said cabinet, a perforated plate slidable under said hopper, perforated slides slidable under said plate and having indentations, ball-boxes under said slides, having openings with which the perforations in said plate and said slide are registrable, a bar on said cabinet transverse to said slides and spring-actuated bolts mounted on said bar and having rounded ends seating in the depressions in said slides, as set forth.

17. In an apparatus of the class described, the combination of a cabinet, ball-boxes housed in said cabinet, slides having holes registrable with holes opening into compartments in said ball-boxes, a ball-hopper above said slides, a perforated cut-off plate slidable between said hopper and said slides, and means for reciprocating said cut-off plate, as set forth.

18. In an apparatus of the class described, the combination of a cabinet, ball-boxes housed in said cabinet, perforated slides in operative relation to said ball-boxes and having indentations, and spring-actuated pins seating in the indentations in said slides, as set forth.

19. In an apparatus of the class described, the combination of a cabinet, ball-boxes housed in said cabinet, perforated slides in operative relation to said ball-boxes, upwardly-projecting pins on said slides, slidable rack-bars, cross-bars connecting said rack-bars and engaging with the pins on said slides, shafts transverse to said rack-bars, cog-wheels on said shafts meshing with teeth on said rack-bars, and handles on said shafts, as set forth.

20. In an apparatus of the class described, the combination of a cabinet, ball-boxes housed in said cabinet, referendum-slides and other slides in operative relation to said ball-boxes, upwardly-projecting pins on all of said slides, a bar slidable above said slides and engaging with the pins on all of the slides except the referendum-slides to move forward all of the slides except the referendum-slides, and a bar slidable above the slides and engaging with the pins on all of the slides to move all of the slides rearward, as set forth.

21. In an apparatus of the class described, the combination of a cabinet, ball-boxes housed in said cabinet, slides in operative relation to said ball-boxes, upwardly-projecting pins on said slides, a front cross-bar and a rear cross-bar slidable above said slides and engaging with the pins thereon, a forked plate secured on said front cross-bar, a ball-hopper above said slides, a cut-off plate between said hopper and said slides, and a pin on said cut-off plate engaged by said forked plate, as set forth.

22. In an apparatus of the class described, the combination of a cabinet, ball-boxes housed in said cabinet, slides in operative relation to said ball-boxes, slidable rack-bars, cross-bars connecting said rack-bars, oscillative shafts transverse to said rack-bars, cog-wheels on said shafts meshing with the racks on said rack-bars, handles on said shafts, a forked plate secured on one of said cross-bars, a ball-hopper above said slides, a cut-off plate between said hopper and said slides and a pin on said cut-off plate engaged by said forked plate, as set forth.

In witness whereof I have hereunto subscribed my name at Chicago, Illinois, this 2d day of February, A. D. 1900.

WILLIAM A. SWAREN.

Witnesses:
   T. C. DOLAN,
   PATRICK DOLAN.